(12) United States Patent
Hwang et al.

(10) Patent No.: US 7,677,784 B2
(45) Date of Patent: *Mar. 16, 2010

(54) OPTICAL UNIT, BACKLIGHT ASSEMBLY HAVING THE SAME AND DISPLAY DEVICE HAVING THE SAME

(75) Inventors: Seong-Yong Hwang, Yongin-si (KR); In-Sun Hwang, Suwon-si (KR); Joong-Hyun Kim, Suwon-si (KR); Hye-Eun Park, Suwon-si (KR); Sang-Yu Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/235,989

(22) Filed: Sep. 23, 2008

(65) Prior Publication Data

US 2009/0034233 A1    Feb. 5, 2009

Related U.S. Application Data

(63) Continuation of application No. 11/393,281, filed on Mar. 29, 2006, now Pat. No. 7,438,459.

(30) Foreign Application Priority Data

Apr. 26, 2005   (KR) ................................ 2005-34605

(51) Int. Cl.
*F21V 7/04*    (2006.01)
*G09F 13/04*   (2006.01)
*G02F 1/13357* (2006.01)

(52) U.S. Cl. .................. 362/613; 362/97.1; 362/617
(58) Field of Classification Search ............. 362/97.1, 362/97.2, 613, 617, 619
See application file for complete search history.

(56) References Cited

U.S. PATENT DOCUMENTS

| 5,394,255 | A  | * | 2/1995 | Yokota et al. | 349/64  |
|-----------|----|---|--------|---------------|---------|
| 6,280,063 | B1 | * | 8/2001 | Fong et al.   | 362/333 |
| 7,320,535 | B2 | * | 1/2008 | Etori         | 362/335 |
| 7,347,609 | B2 | * | 3/2008 | Yang et al.   | 362/619 |
| 2007/0188861 | A1 | * | 8/2007 | Kim et al. | 359/455 |

* cited by examiner

*Primary Examiner*—Stephen F Husar
*Assistant Examiner*—James W Cranson
(74) *Attorney, Agent, or Firm*—Innovation Counsel LLP

(57) ABSTRACT

An optical unit includes a base, a light-condensing member disposed on the base to condense a first portion of light that is incident onto the base and protrusion members disposed on a surface of the light-condensing member to scatter a second portion of the light that is incident onto the base. A backlight assembly includes light sources, an optical unit receiving light from the light sources to condense and scatter the light, and may also include an optical member disposed over the optical unit to enhance the front luminance of the light. A display device includes light sources, an optical module and a display panel. Thus, display quality of the display device may be enhanced.

19 Claims, 9 Drawing Sheets

130 111 110

Ashburn, Va. 22011

OPTICAL UNIT, BACKLIGHT ASSEMBLY HAVING THE SAME AND DISPLAY DEVICE HAVING THE SAME

CROSS REFERENCE TO RELATED APPLICATIONS

This application is a continuation of U.S. patent application Ser. No. 11/393,281, filed Mar. 29, 2006, now U.S. Pat. No. 7,438,459 which claims priority of Korean Patent Application No. 2005-34605 filed on Apr. 26, 2005, the contents of which are herein incorporated by reference in their entirety.

BACKGROUND OF THE INVENTION

1. Field of the Invention

The present invention relates to an optical unit, a backlight assembly having the optical unit and a display device having the optical unit. More particularly, the present invention relates to an optical unit capable of condensing and diffusing light, a backlight assembly having the optical unit and a display device having the optical unit.

2. Description of the Related Art

Generally, a backlight assembly of a display device is classified as either an edge illumination type backlight assembly or a direct illumination type backlight assembly.

The edge illumination type backlight assembly includes a light guiding plate and a lamp disposed at a side of the light guiding plate. The edge illumination type backlight assembly is usually employed in a display device having a relatively small display size. The edge illumination type backlight assembly has many merits, such as good optical uniformity, long lifetime, small size, etc.

The direct illumination type backlight assembly has been developed as the size of liquid crystal display (LCD) devices has increased over time. The direct illumination type backlight assembly includes a plurality of lamps disposed under a light-diffusing plate and arranged substantially parallel to each other. The direct illumination type backlight assembly includes more lamps than the edge illumination type backlight assembly, and thus has a relatively high luminance.

However, in a direct illumination type backlight assembly, the lamp configuration may be detected through the light-diffusing plate. Therefore, the display quality of a display device employing a direct illumination type backlight assembly may be lower than the display quality of a display device employing an edge illumination type backlight assembly.

SUMMARY OF THE INVENTION

Systems and techniques provided herein may reduce or eliminate drawbacks of existing direct illumination type backlight assemblies. In embodiments of the invention, an optical unit configured to condense and diffuse externally-provided light is disclosed.

Embodiments of the present invention also provide a backlight assembly having the above-mentioned optical unit to irradiate light having enhanced luminance uniformity.

Embodiments of the present invention also provide a display device having the above-mentioned backlight assembly.

In one aspect of the present disclosure, an optical unit includes a base, a light-condensing member and a plurality of protrusion members. The light-condensing member is disposed on the base to condense a first portion of light that is incident onto the base. The protrusion members are disposed on a surface of the light-condensing member to scatter a second portion of the light that is incident onto the base.

The light-condensing member may include a first slant face and a second slant face. The first slant face protrudes from the base to form a first obtuse angle with respect to the base. The second slant face protrudes from the base and is slanted toward the first slant face.

The light-condensing member optionally includes a third slant face and a fourth slant face. The third slant face extends from an upper portion of the first slant face to form a second obtuse angle. The fourth slant face extends from an upper portion of the second slant face and connected to the third slant face.

The light-condensing member optionally includes a horizontal face substantially parallel to the base and connected to the first and second slant faces.

In another aspect of the present disclosure, a backlight assembly includes a light source, an optical unit and an optical member. The light source generates light. The optical unit includes a light-condensing portion and a protrusion portion. The light-condensing portion is disposed on a base to condense a first portion of the light generated from the light source. The protrusion portion is disposed on a surface of the light-condensing portion to scatter a second portion of the light generated from the light source. The optical member receives light from the optical unit and is configured to emit light having substantially uniform luminance with respect to a front direction of the base.

The backlight assembly may include a plurality of light sources. Images of the light sources, which have a second number that is greater than a first number of the light sources, are formed between the optical unit and the optical member. The light-condensing portion may have various shapes. The light-condensing portion, for example, includes slant faces. A portion at which slant faces and the base are connected and a portion at which slant faces are connected with each other may have a rounded portion having a predetermined radius of curvature.

In still another aspect of the present disclosure, a display device includes a plurality of light sources, an optical module and a display panel. The light sources generate light, and have a first number. The optical module receives the light from the light sources to form images of the light sources. The images have a second number that is greater than the first number. The optical module may emit light having substantially uniform luminance with respect to a front direction of the optical module. The display panel is disposed over the optical module to display an image using light from the optical module.

According to the above, images of light sources, the number of which may be at least double of the number of the light sources, are formed between the optical unit and the optical member, and light emitted from the light sources diffuses through the optical unit. Thus, bright lines generated on the optical member may be reduced, and display quality of the display device having the optical unit may be enhanced.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
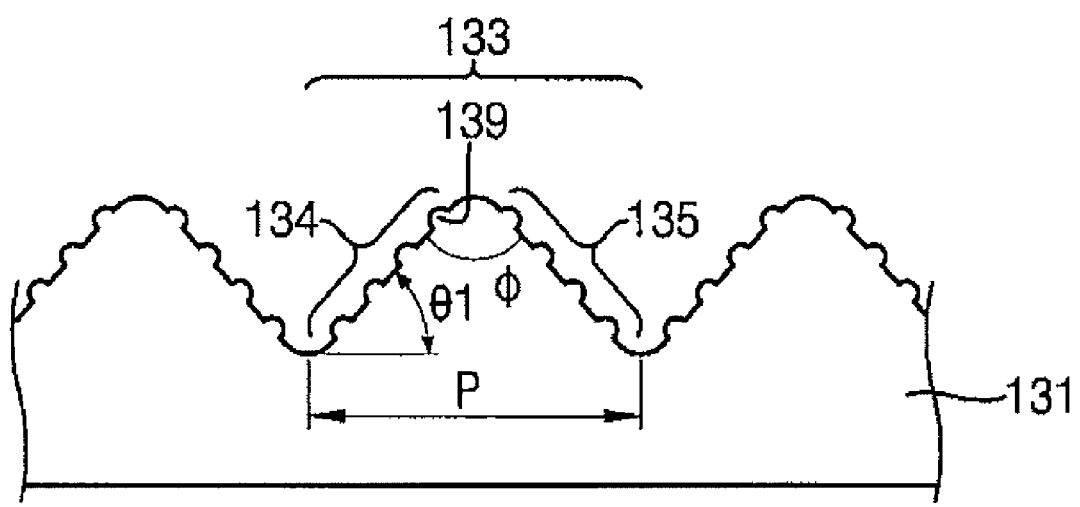
FIG. 1 is a cross-sectional view illustrating a portion of an optical unit according to an exemplary embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully describe the invention to those skilled in the art. Like reference numerals refer to similar or identical elements throughout.

Optical Unit

FIG. 1 is a cross-sectional view illustrating a portion of an optical unit according to an example embodiment of the present invention.

Referring to FIG. 1, an optical unit 130 includes a base 131, a light condenser such as light-condensing member 133, and protrusion members 139.

The base 131 serves as a body of the optical unit 130. The base 131 may include a transparent material having a high optical transmissivity, for example, base 131 may include a material such as polyethylene terephthalate (PET).

The light-condensing member 133 is disposed on or over the base 131. The light-condensing member 133 may have various shapes. For example, the light-condensing member 133 may have a rod shape that is elongated along one direction, and may have a substantially polygonal cross section (e.g., a substantially triangular cross section as shown in FIG. 1). The optical unit may include a plurality of light condensing members 133, and the light condensing members are disposed substantially parallel to each other. The light-condensing member 133, for example, may include a material that is substantially the same material as that of the base 131. The light-condensing member 133 may include polymethyl methacrylate (PMMA), which has advantageous characteristics such as good heat resistance, high optical transmissivity, good chemical resistance, etc.

As noted above, a cross-section of the light-condensing member 133, which is substantially perpendicular to a longitudinal direction of the light-condensing member 133, may have a polygonal shape. The light-condensing member 133 may have various geometrical structures for changing an optical path of light provided into the optical unit 130 toward a front direction of the optical unit 130.

In some embodiments, the light-condensing member 133 includes a first slant face 134 and a second slant face 135. The first slant face 134 protrudes from the base 131 to form a first obtuse angle $\theta 1$ with respect to the base 131. The second slant face 135 protrudes from the base 131 and faces the first slant face 134. The second slant face 135 is slanted toward the first slant face 134.

As shown in FIG. 1, the first slant face 134 and the second slant face 135 are substantially symmetrical to each other with respect to a plane that is substantially perpendicular to the base 131. The first and second slant faces 134 and 135 are elongated along the longitudinal direction of the light-condensing member 133 (into the page of FIG. 1).

In order to effectively condense the light provided into the base 131 toward the front direction of the optical unit 130, the first and second slant faces 134 and 135 may preferably form an angle $\phi$ of about thirty degrees to about one hundred fifty degrees.

The first and second slant faces 134 and 135 are connected with each other at a top portion, and the top portion may be rounded. The first and second slant faces 134 and 135 are connected with base 131 at a bottom portion, and the bottom portion may be rounded.

When the top portion and the bottom portion, at which the base 131, the first slant face 134 and the second slant face 135 are connected with each other, have a rounded portion, light may effectively diffuse through the rounded portion. Thus, compared to a configuration where the portion is not rounded, the appearance of bright lines (when viewed over the optical unit 130) may be reduced.

The rounded portion of the top portion and the bottom portion may preferably have a radius of curvature in a range of about 0.05 times to about 0.7 times a pitch of the light-condensing member 133. The pitch P of the light-condensing member 133 is defined as an interval between neighboring top portions or between neighboring bottom portions (as indicated in the example illustrated in FIG. 1).

In the embodiment shown in FIG. 1, the light-condensing member 133 includes the first and second slant faces 134 and 135 that comprise generally flat surfaces. Alternatively, the light-condensing member 133 may include a slant face comprising a curved surface. For example, the light-condensing member 133 may include a first curved slant face that protrudes from the base 131 and a second curved slant face that protrudes from the base 131 and is connected to the first curved slant face. At least one of the first and second curved slant faces may be convex. Further, at least one of the first and second curved slant faces may be concave.

The protrusion members 139 protrude from a surface of the light-condensing member 133. The protrusion members 139 cover a portion of the surface of the light-condensing member 133. A protruded amount and a protruded size of each protrusion member 139 may be varied. The protrusion members 139 are formed such that the light-condensing member 133 has a surface roughness of about 0.1 to about 10 micrometers root mean square.

Figure 2:
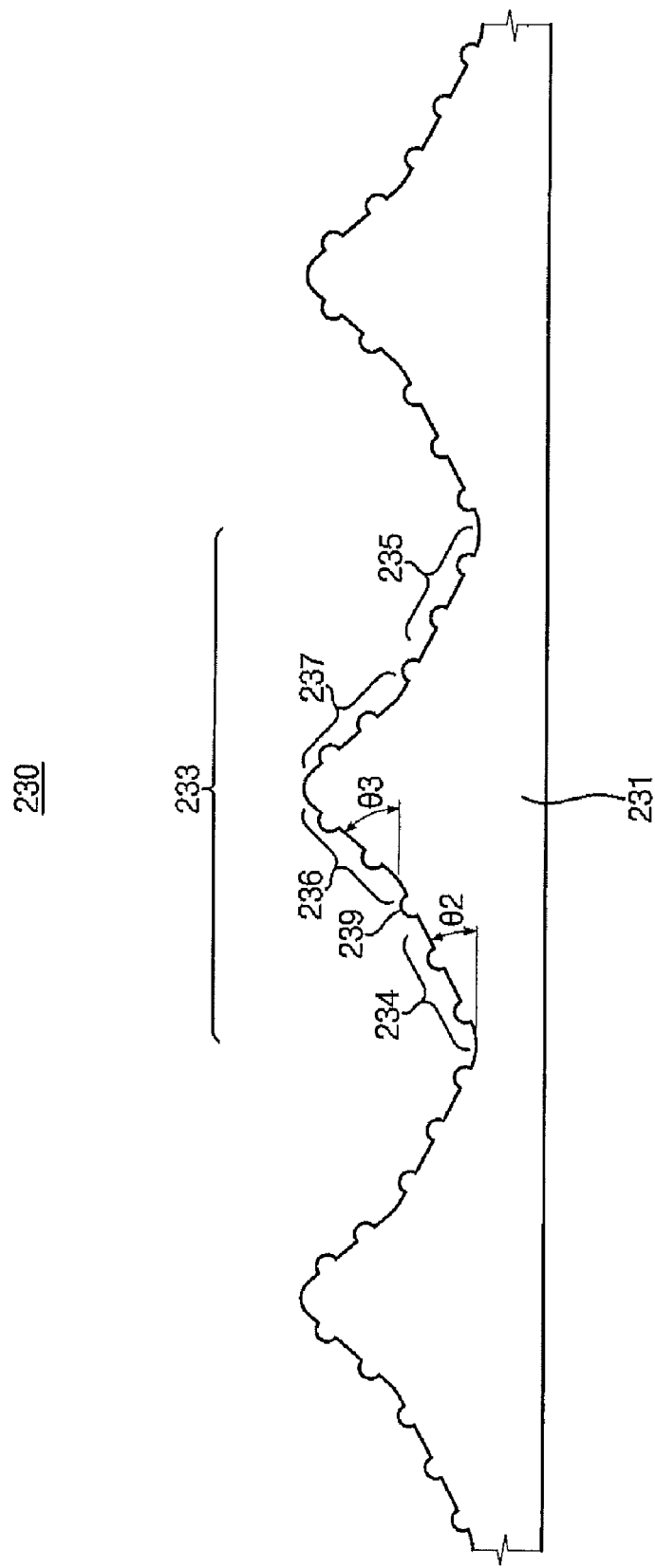
FIG. 2 is a cross-sectional view illustrating a portion of an optical unit according to another exemplary embodiment of the present invention.

FIG. 2 is a cross-sectional view illustrating a portion of an optical unit according to another exemplary embodiment of the present invention.

Referring to FIG. 2, an optical unit 230 includes a base 231, a light-condensing member 233 and protrusion members 239. The exemplary optical unit 230 shown in FIG. 2 is substantially identical to the exemplary optical unit 130 shown in FIG. 1 except for the number of slant faces of the light-condensing member 233.

The light-condensing member 233 includes first, second, third and fourth slant faces 234, 235, 236 and 237, which are elongated along a longitudinal direction of the light-condensing member 233 (into the page of FIG. 2).

The first slant face 234 protrudes from the base 231 to form a first obtuse angle θ2 with respect to the base 231. The second slant face 235 protrudes from the base 231 and faces the first slant face 234. The second slant face 235 is slanted toward the first slant face 234. As shown in FIG. 2, the first slant face 234 and the second slant face 235 are substantially symmetrical to each other with respect to a plane that is substantially perpendicular to the base 231 (i.e., a plane that extends vertically and into the page of FIG. 2).

The third slant face 236 extends from an upper portion of the first slant face 234 to form a second obtuse angle θ3 with respect to the base 231. The fourth slant face 237 extends from an upper portion of the second slant face 235 and is thus connected to the third slant face 236. As shown in FIG. 2, the third slant face 236 and the fourth slant face 237 are substantially symmetrical to each other with respect to a plane that is substantially perpendicular to the base 231 (i.e., a plane that extends vertically and into the page of FIG. 2).

The first obtuse angle θ2 and the second obtuse angle θ3 are different from one another. As shown in FIG. 2, the second obtuse angle θ3 is greater than the first obtuse angle θ2. The third and fourth slant faces 236 and 237 may preferably form an angle φ of about thirty degrees to about one hundred fifty degrees.

The first and second slant faces 234 and 235 are connected with base 231 at a bottom portion, and the third and fourth slant faces 236 and 237 are connected with each other at a top portion. The bottom portion and the top portion may be rounded to have a predetermined radius of curvature.

Figure 3:
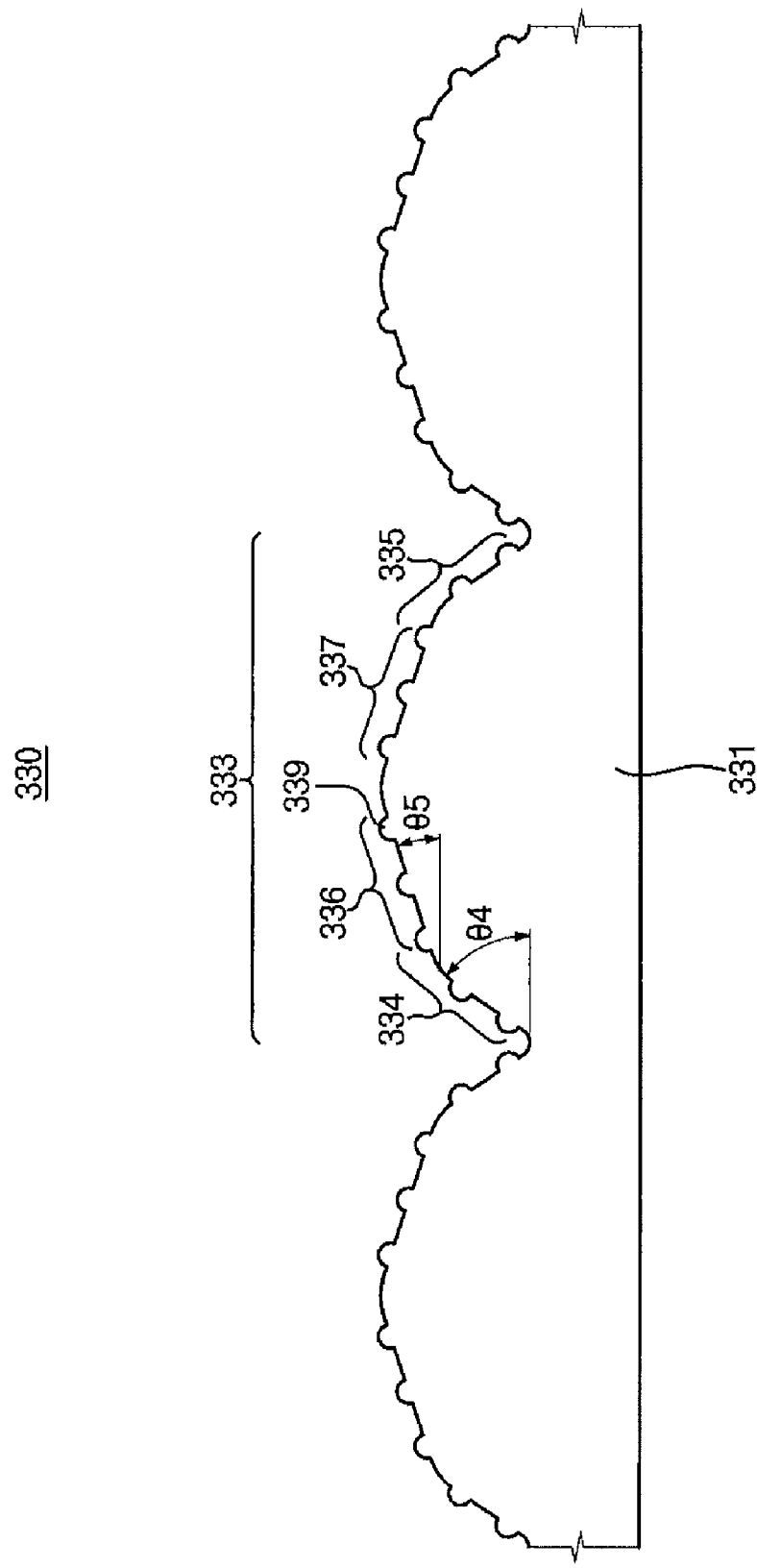
FIG. 3 is a cross-sectional view illustrating a portion of an optical unit according to still another exemplary embodiment of the present invention.

FIG. 3 is a cross-sectional view illustrating a portion of an optical unit 330 according to still another exemplary embodiment of the present invention.

Referring to FIG. 3, an optical unit 330 includes a base 331, a light-condensing member 333 and protrusion members 339. The light-condensing member 333 includes first, second, third and fourth slant faces 334, 335, 336 and 337.

In the exemplary embodiment shown in FIG. 3, the optical unit 330 is substantially identical to the exemplary optical unit 230 shown in FIG. 2 except for a first angle θ4 being greater than a second angle θ5. Here, the first slant face 334 and the second slant face 335 form the first angle θ4 with respect to the base 331, and the third slant face 336 and the fourth slant face 337 form the second angle θ5 with respect to the base 331.

Figure 4:
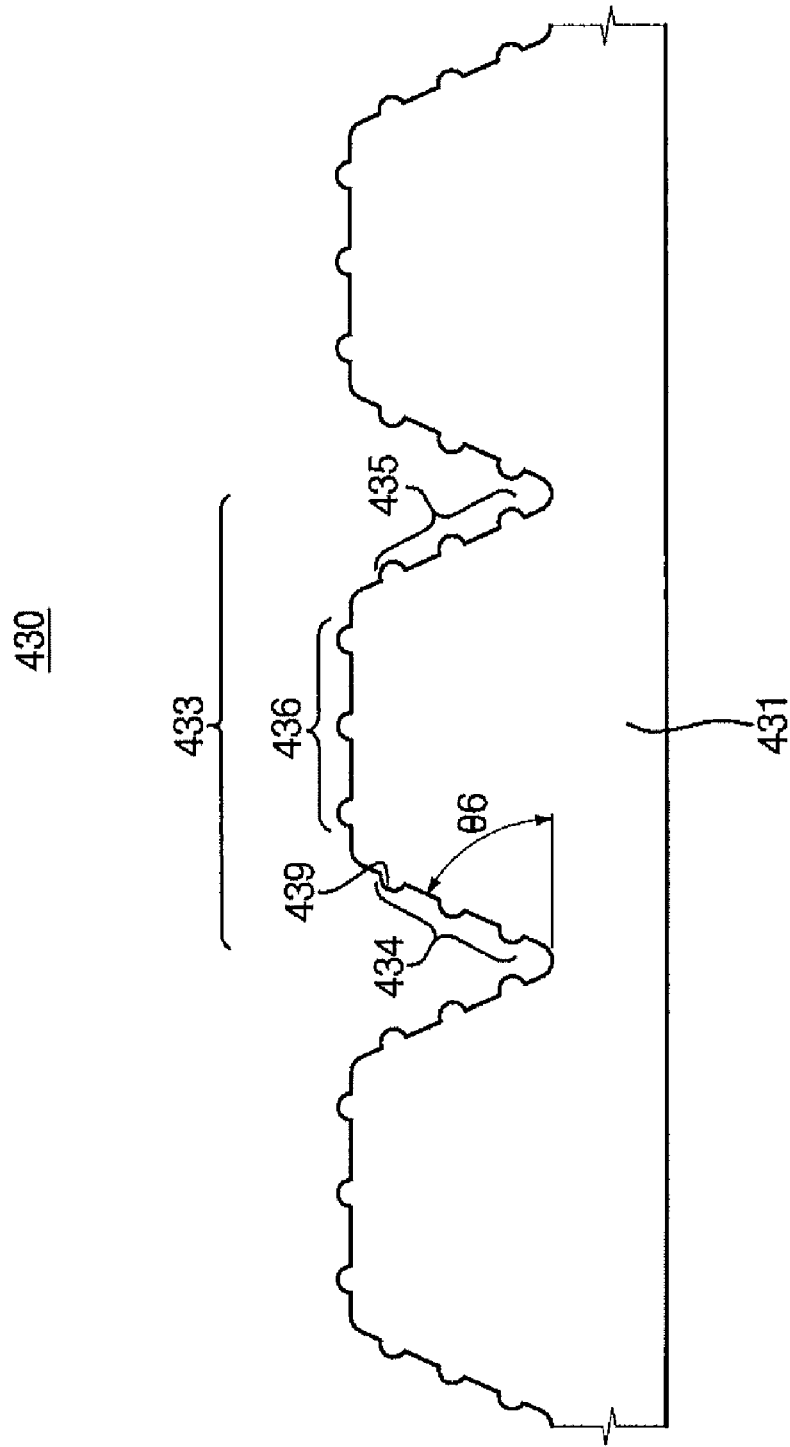
FIG. 4 is a cross-sectional view illustrating a portion of an optical unit according to still another exemplary embodiment of the present invention.

FIG. 4 is a cross-sectional view illustrating a portion of an optical unit 430 according to still another exemplary embodiment of the present invention.

Referring to FIG. 4, an optical unit 430 includes a base 431, a light-condensing member 433 and protrusion members 439.

The light-condensing member 433 is disposed on a surface of the base 431. The light-condensing member 433 includes a first slant face 434, a second face 435 and a horizontal face 436.

The first slant face 434 protrudes from the base 431 to form a first obtuse angle θ6 with respect to the base 431. The second slant face 435 protrudes from the base 431 and faces the first slant face 434. The second slant face 435 is slanted toward the first slant face 434. As shown in FIG. 4, the first slant face 434 and the second slant face 435 are substantially symmetrical to each other with respect to a plane that is substantially perpendicular to the base 431 (i.e., a plane that extends vertically and into the page of FIG. 4).

The horizontal face 436 is substantially parallel to the base 431. A first end portion of the horizontal face 436 is connected to an upper portion of the first slant face 434, and a second end portion of the horizontal face 436, which faces the first end portion, is connected to an upper portion of the second slant face 435.

Backlight Assembly

Figure 5:
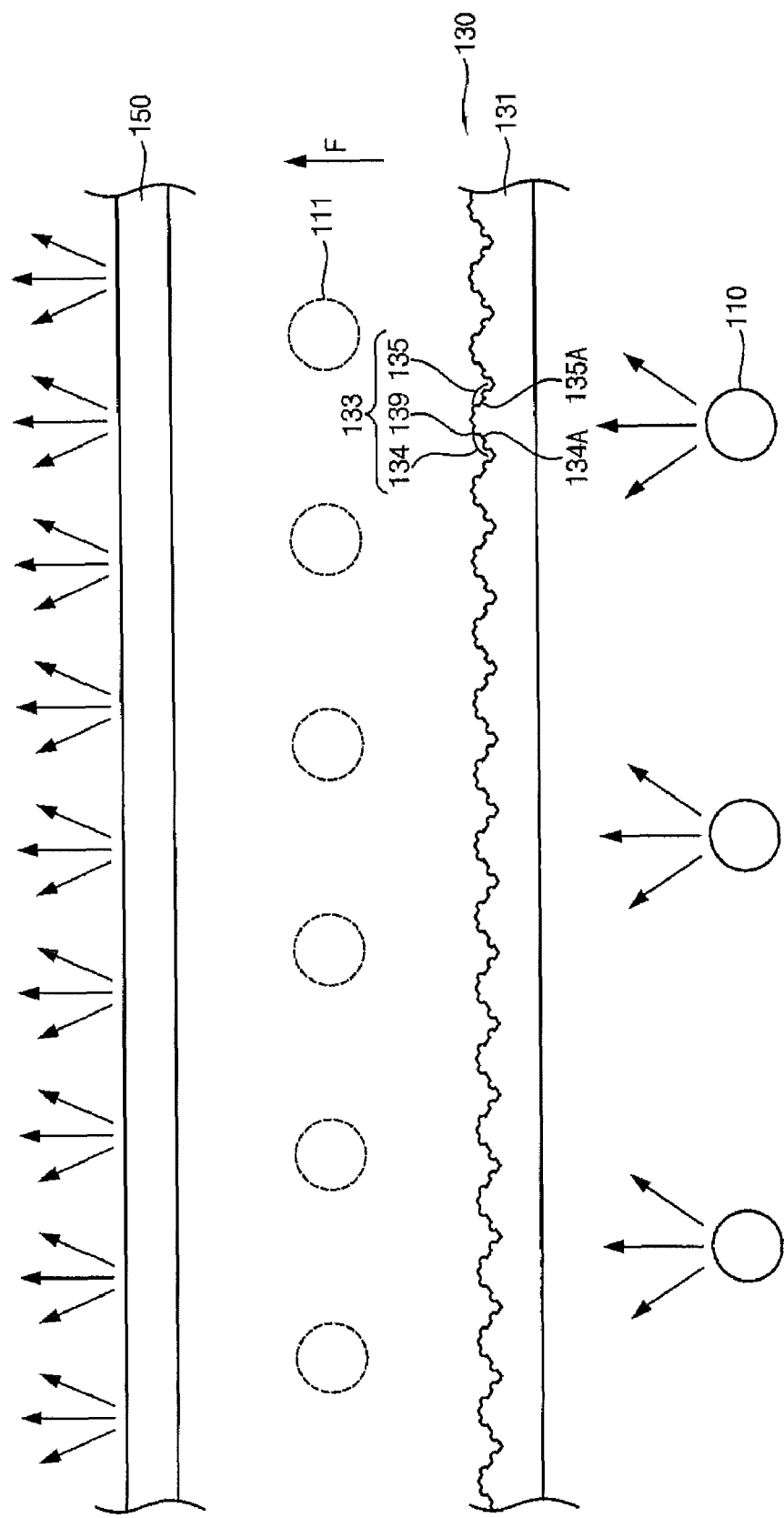
FIG. 5 is a cross-sectional view illustrating a portion of a backlight assembly according to an exemplary embodiment of the present invention.

FIG. 5 is a cross-sectional view illustrating a portion of a backlight assembly 100 according to an exemplary embodiment of the present invention.

Referring to FIG. 5, a backlight assembly 100 includes a plurality of light sources 110, an optical unit 130 and an optical member 150. The optical unit 130 shown in FIG. 5 is substantially identical to the optical unit 130 shown in FIG. 1. Thus, the same reference numerals will be used to refer to the corresponding parts and further description concerning the corresponding parts may be omitted. Hereinafter, the light-condensing member 133 referred to in the description associated with FIG. 1 will be referred to as a light-condensing portion, and the protrusion member 139 referred to in the description associated with FIG. 1 will be referred to as a protrusion portion.

The light sources 110 may include at least one of a fluorescent lamp, a surface light source, and a light emitting diode. The backlight assembly 100, for example, includes lamps 110 having a substantially linear and tubular shape. The lamps 110 are substantially parallel to each other.

In some embodiments, each of the lamps 110 includes a lamp tube and electrode parts. The lamp tube, for example, includes glass. A fluorescent material is coated on an inner surface of the lamp tube, and discharge gas is charged in an inner space of the lamp tube. A discharge voltage (which may be provided externally) is applied to the electrode parts, so that the discharge gas generates light having a wavelength outside the visible spectrum. The fluorescent material converts the light into visible light (light having a wavelength in the visible spectrum).

The optical unit 130 changes an optical path of a first portion of light provided from the lamps to face a front direction of the optical unit 130, and scatters a second portion of the light provided from the lamps, as described further below. The optical unit 130 is spaced apart from the lamps 110 by a predetermined distance, and includes a base 131, a light-condensing portion 133 and protrusion portions 139.

Figure 6:
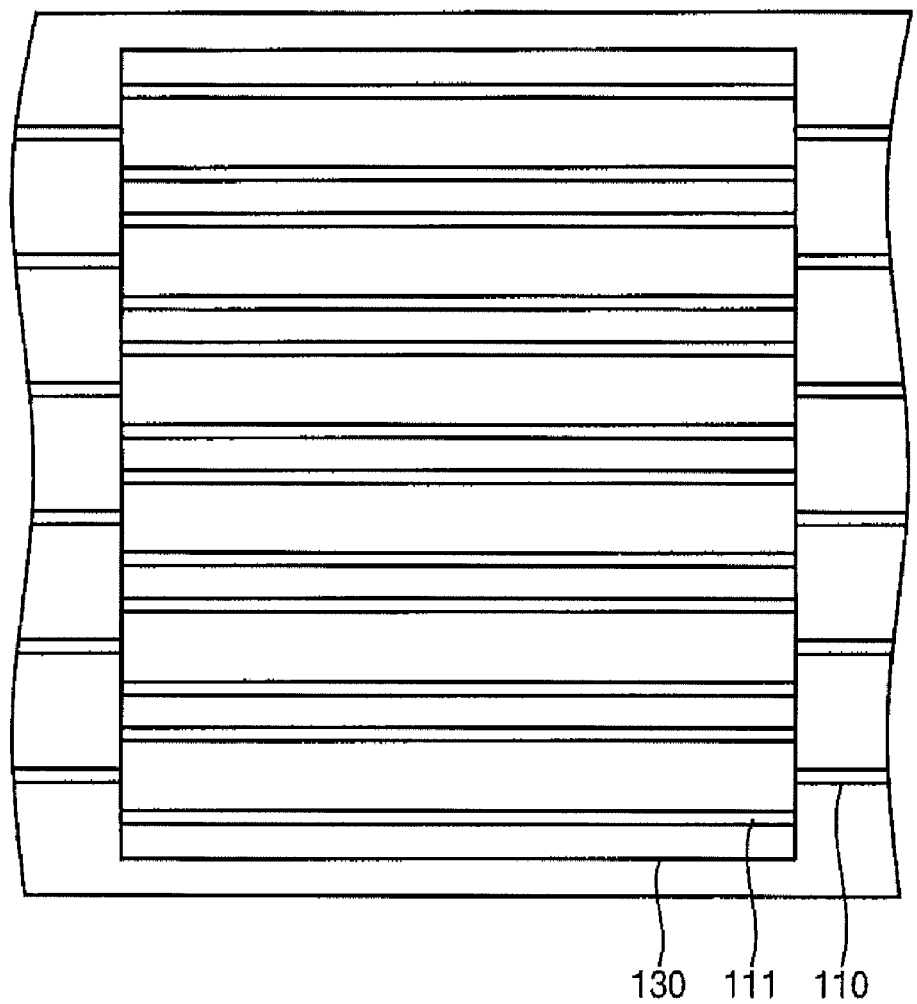
FIG. 6 is a plan view illustrating a portion of lamps viewed through an optical unit shown in FIG. 5.

FIG. 6 is a plan view illustrating a portion of lamps viewed through an optical unit such as optical unit 130 shown in FIG. 5.

Referring to FIGS. 5 and 6, the light emitted from the lamps 110 is incident onto the base 131 of the optical unit 130. A portion 134A of the incident light passes through a region of first slant face 134 on which protrusions are not formed, while a portion 135A of the incident light passes through a region of second slant face 135 on which protrusion portions 139 are not formed. For convenience, the description below will be based on a cross-section of the light-condensing portion 133 which is substantially perpendicular to the longitudinal direction of the light-condensing portion 133 (such as the cross section illustrated in FIG. 5).

When the portion 134A is incident onto the first slant face 134 at a predetermined clockwise angle with respect to a normal line to the first slant face 134, the light is refracted such that the direction of the transmitted light is more aligned with a front direction F of the base 131.

When the portion 134A is incident onto the first slant face 134 at a predetermined counterclockwise angle with respect to a normal line to the first slant face 134, the light is refracted such that the direction of the transmitted light is less aligned with the front direction of the base 131. Light passing through the protrusion portions 139 is scattered.

As a result, for each of the lamps 110, there are two positions at which light is condensed in the front direction of the optical unit 130. Two lamp images 111 are formed at the two positions associated with each of the lamps 110, so that the number of lamp images 111 is twice the number of lamps 110.

Lamp images 111 are formed over the optical unit 130. Since a portion of the incident light diffuses when exiting through the protrusion portions 139, a second luminance of the lamp images 111 is reduced compared to a first luminance of the associated lamp of the lamps 110.

The optical member 150 receives light from the optical unit 130, and emits light having enhanced optical characteristics; for example, enhanced luminance uniformity. In some embodiments, the optical member 150 is separated from the optical unit 130 by a sufficient distance so that the lamp images 111 are formed between the optical unit 130 and the optical member 150. The optical member 150, for example, includes a base body, diffusion beads disposed on the base body to diffuse incident light, and binders disposed between the diffusion beads to fasten the diffusion beads to the base body.

As noted above, the second number of the lamp images 111 formed between the optical unit 130 and the optical member 150 may be about double of the first number of the lamps 110, and the second luminance of the lamp images 111 is reduced in comparison with the first luminance of the lamps 110. As a result, a second interval between adjacent lamp images 111 is smaller than a first interval between adjacent lamps 110.

Accordingly, the luminance distribution of light entering the optical member 150 becomes more uniform. The luminance distribution of light entering optical member 150 may substantially reduce or eliminate the detection of bright lines in the light transmitted through optical member 150.

Even though the second number of the lamp images 111 is about double the first number of the lamps 110, the bright lines may be detected in the light transmitted through the optical member 150 when the second luminance of the lamp images 111 is relatively high.

However, according to the present disclosure, a portion of the light that is incident onto the base 131 diffuses when exiting through the protrusion portions 139 formed on the light-condensing portion 133. Thus, the amount of light refracted through the light-condensing portion 133 toward the front direction of the optical unit 130 to form lamp images 111 is reduced. As a result the second luminance of the lamp images 111 decreases, and the detection of bright lines in the light transmitted through optical member 150 corresponding to the lamp images 111 may be substantially reduced or prevented.

Accordingly, even though a distance between the lamps 110 and the optical member 150 of the backlight assembly 100 may be shorter than that of a conventional backlight assembly (for example, the distance may be about 9 mm or less), the bright lines may be reduced. Hence, the backlight assembly 100 may be made relatively thin, compared to conventional backlight assemblies.

Figure 7:
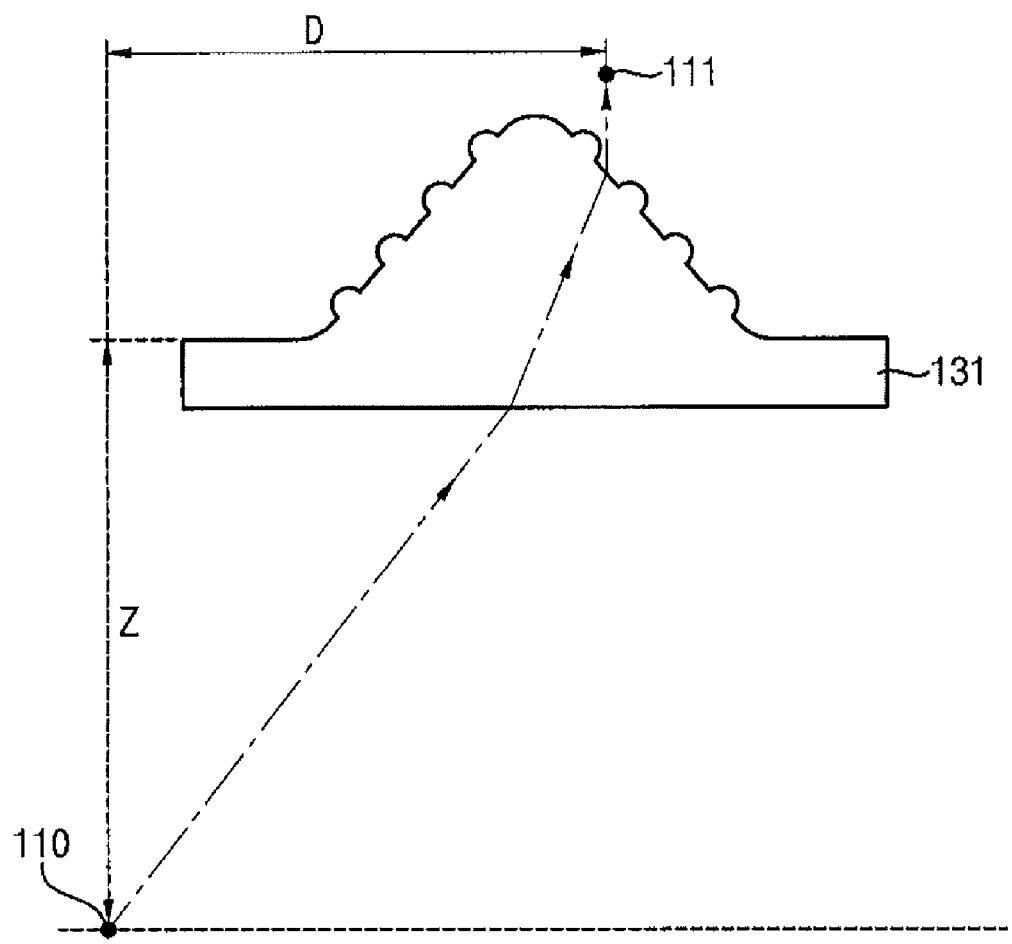
FIG. 7 is a cross-sectional view illustrating a position of a lamp image formed over an optical unit of the backlight assembly shown in FIG. 5.
Figure 8:
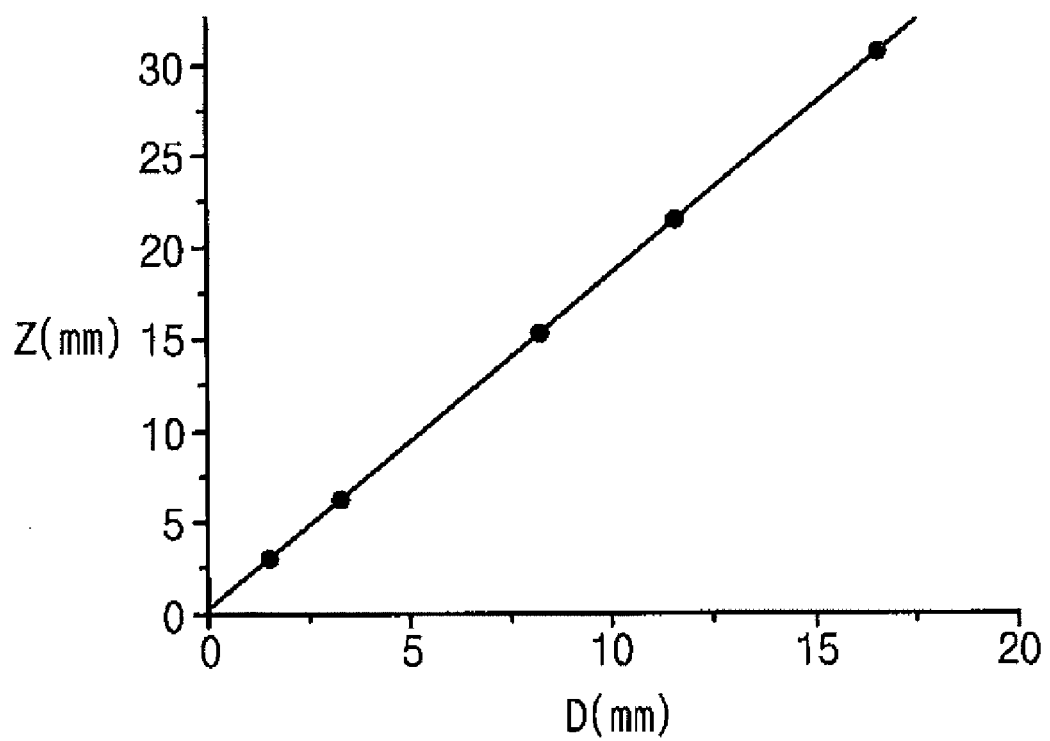
FIG. 8 is a graph illustrating a relationship between a first distance 'Z' and a second distance 'D' in FIG. 7.

FIG. 7 is a cross-sectional view illustrating a position of a lamp image 111 formed over an optical unit 130 of the backlight assembly 100 shown in FIG. 5. FIG. 8 is a graph illustrating a relationship between a first distance 'Z' and a second distance 'D' in FIG. 7.

Referring to FIGS. 7 and 8, the first distance 'Z' is defined as a distance from the lamps 110 to an upper face of the base 131 on which the light-condensing portion 133 is formed, and the second distance 'D' is defined as a distance from an axis, which passes through a center of the lamp 110 and is substantially perpendicular to the base 131, to one of the lamp images 111 associated with that lamp 110.

When the first distance 'Z' increases, the second distance 'D' also increases. When the first distance 'Z' decreases, the second distance 'D' also decreases. Thus, when the first distance 'Z' decreases, a distance between two lamp images 111 adjacent to each other, which corresponds to 2×'D', decreases. When the distance between the two lamp images 111 becomes too small, the two lamp images 111 may be hard to distinguish from one another, so that the two lamp images 111 may be recognized as one image.

When the first distance 'Z' becomes too large, two lamp images 111 adjacent to each other of four lamp images 111 generated from two lamps 110 may be difficult to distinguish from one another.

Accordingly, the first distance 'Z' may be determined, such that the distances between adjacent lamp images 111 may be substantially uniform and the lamp images 111, which have the second number that is greater than the first number of the lamps 110, may be formed to reduce the bright lines.

For example, in some embodiments, the distance between the lamps 110 and the optical member 150 is no more than about 9 mm. The first distance 'Z' is equal to the difference between the distance between the lamps 110 and the optical member 150 and the distance between the optical member 150 and the optical unit 130.

Display Device

Figure 9:
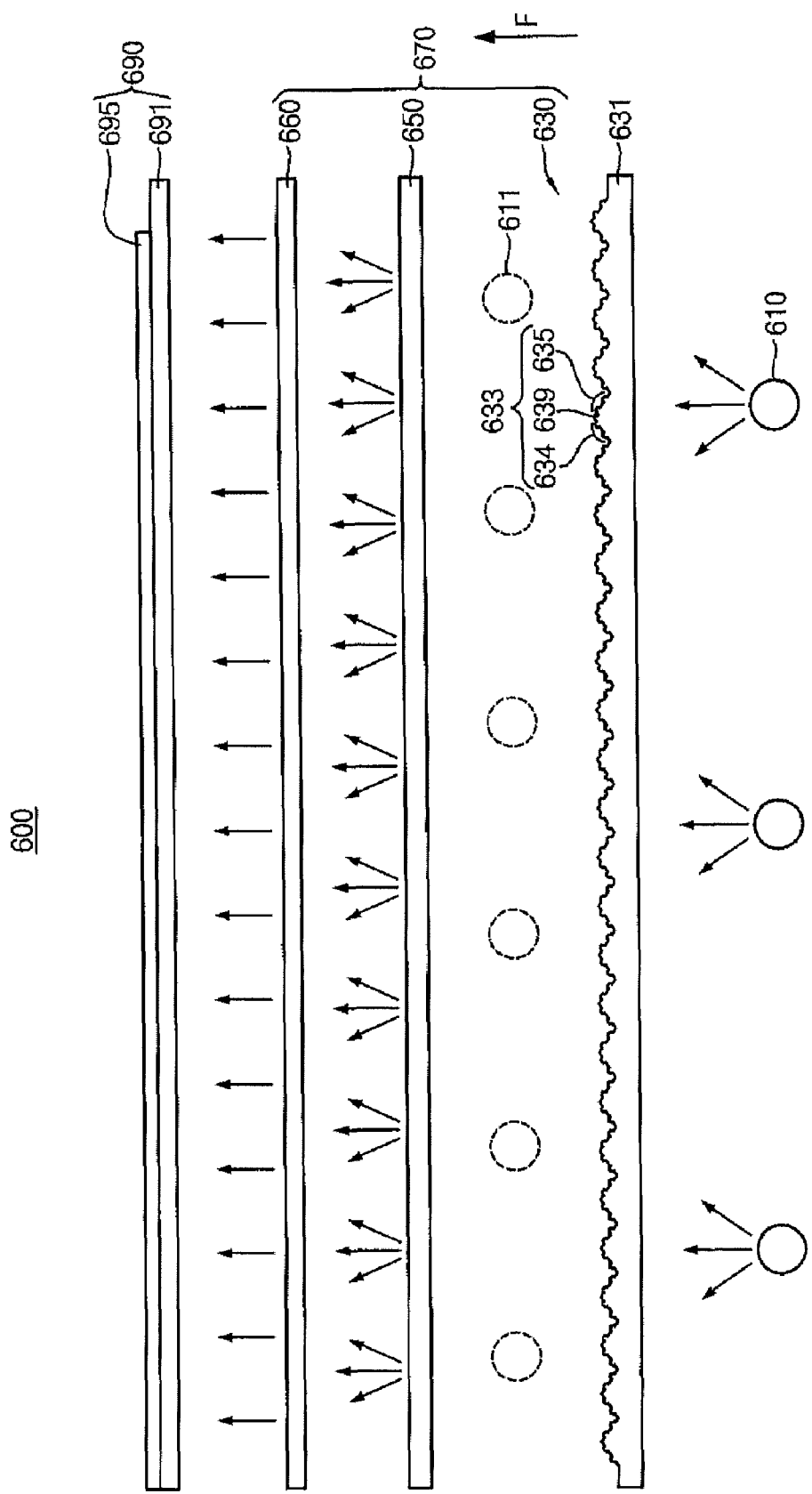
FIG. 9 is a cross-sectional view illustrating a display device according to an exemplary embodiment of the present invention.

FIG. 9 is a cross-sectional view illustrating a display device according to an example embodiment of the present invention.

Referring to FIG. 9, a display device 600 includes a plurality of light sources 610, an optical module 670 and a display panel 690.

The light sources 610 illustrated in FIG. 9 are substantially identical to the light sources in FIGS. 5 to 8. Many types of light sources may be used.

The optical module 670 is disposed over the light sources 610 to form images using light provided from the light sources 610. The number of the images is greater than the number of the light sources 610. Light, a luminance distribution of which is substantially uniform with respect to a front of the optical module 670, exits the optical module 670. The optical module 670 includes an optical unit 630 and an optical member 650.

The optical unit 630 and the optical member 650 illustrated in FIG. 9 are substantially identical to the optical unit 130 and the optical member 150, which are shown in FIGS. 5 to 8. However, other configurations may be used (e.g., different numbers of protrusions 639, different shapes, different relative placements and sizes, etc.). The optical unit 630 may include a body 631, a light-condensing portion 633 and protrusion portions 639, which correspond to the base 131, the light-condensing member 133 and the protrusion members 139 shown in FIG. 5, respectively.

Light is incident onto the body 631 and then passes through the light-condensing portion 633. A portion of the light passing through the light-condensing portion 633 is refracted and condensed in a front direction F of the optical unit 630. Thus, images 611 having a first number are formed. The first number of the images 611 is greater than a second number of the light sources 610. The images 611 are formed between the optical unit 630 and the optical member 650. Light passing through each of the protrusion portions 639 is scattered to exit the optical unit 630.

The optical member 650 enhances optical characteristics, such as the luminance uniformity of light emitted from the optical unit 630, and thus light having the enhanced optical characteristics exits the optical member 650.

The optical module 670 optionally includes a light-condensing sheet 660. The light-condensing sheet 660 increases the front luminance of the light by changing the optical path of the light to increase the portion transmitted in the front direction F of display device 600.

The display panel 690 is disposed over the light-condensing sheet 660 to display an image using the light emitted from the light-condensing sheet 660. The display panel 690 includes a first substrate 691, a second substrate 695 and a liquid crystal layer (not shown). The first and second substrates 691 and 695 face each other. The liquid crystal layer is disposed between the first and second substrates 691 and 695.

The first substrate 691 may include a plurality of first electrodes that are arranged in a matrix configuration and a plurality of switching elements each of which applies a predetermined voltage to corresponding first electrodes. The second substrate 695 may include a second electrode facing the first electrodes and a color filter for displaying a predetermined color using externally provided light.

When an electric power is applied to the first and second electrodes, electric fields are generated between the first and second electrodes. Molecules of the liquid crystal layer between the first and second electrodes are oriented according to the local electric field. Since the optical transmissivity of the liquid crystal depends on the orientation of the molecules of the liquid crystal material, the displayed image may be changed by changing the voltages applied to the electrodes of the display panel 690.

According to the present disclosure, the optical unit condenses a portion of light emitted from light sources toward a front direction of the optical unit, and diffuses a remaining portion of the light. Thus, lamp images, the number of which is about double of the number of the lamps, are formed between the optical unit and the optical member. Hence, the backlight assembly having the above structure has substantially the same effect as a backlight assembly including a larger number of light sources disposed at narrower intervals.

In addition, the luminance of the lamp images is reduced in comparison with the luminance of the lamps. Thus, bright lines generated on the optical member decrease, and the display quality of a display device having the optical unit may be enhanced.

Although the optical unit has been primarily discussed with reference to the exemplary configuration of FIG. 1, other configurations may be used. For example, configurations with additional slant faces (e.g., as shown in FIGS. 2 and 3), configurations with a horizontal portion (e.g., as shown in FIG. 4), and configurations with curved surfaces (concave and/or convex, as described above). For these different configurations, the associated light condensing portions condense light differently than the configuration of FIG. 1. For example, the configuration of FIG. 2 may provide for four lamp images for each lamp, rather than two.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An optical unit comprising:
   a base;
   a light-condensing member comprising a first curved slant face protruding from the base and a second curved slant face protruding from the base, the second curved slant face being slated toward the first curved slant face; and
   a plurality of protrusion members protruding from a surface of the light-condensing member.

2. The optical unit of claim 1, wherein at least one of the first and second curved slant faces is concave.

3. The optical unit of claim 2, wherein the first and second curved slant faces are connected at a rounded top portion.

4. The optical unit of claim 1, wherein the first curved slant face comprises a first face protruding from the base to form a first angle with respect to the base and a second face extending from an upper portion of the first face to form a second angle with respect to the base, and
   the second curved slant face comprises a third face protruding from the base toward the first face to form the first angle with respect to the base and a fourth face extending from an upper portion of the third face to be connected to the second face, the fourth face forming the second angle with respect to the base.

5. The optical unit of claim 4, wherein the first angle is lager than the second angle.

6. The optical unit of claim 4, wherein the first and second faces are connected at a first rounded portion, and the third and fourth faces are connected at a second rounded portion.

7. The optical unit of claim 6, wherein the first, second, third, and fourth faces respectively comprises a flat surface.

8. A backlight assembly comprising:
   a plurality of light sources configured to generate light;
   an optical unit to condense and diffuse the light, the optical unit comprising:
   a base;
   a light-condensing portion comprising a first curved slant face protruding from the base and a second curved slant face protruding from the base, the second curved slant face being slated toward the first curved slant face; and
   a protrusion portion disposed on a surface of the light-condensing portion.

9. The backlight assembly of claim 8, wherein the light sources have a first number and the optical unit receives the light from the light sources to form images of the light sources, the images having a second number that is greater than the first number.

10. The backlight assembly of claim 9, wherein the light-condensing portion is elongated along a longitudinal direction of the light source.

11. The backlight assembly of claim 9, wherein the first and second curved slant faces are connected at a rounded top portion.

12. The backlight assembly of claim 11, wherein the first curved slant face comprises a first face protruding from the base to form a first angle with respect to the base and a second face extending from an upper portion of the first face to form a second angle with respect to the base, and
   the second curved slant face comprises a third face protruding from the base toward the first face to form the first angle with respect to the base and a fourth face extending from an upper portion of the third face to be connected to the second face, the fourth face forming the second angle with respect to the base,
   wherein the first angle is larger than the second angle.

13. The backlight assembly of claim 12, wherein the first and second faces are connected at a first rounded portion, and the third and fourth faces are connected at a second rounded portion.

14. A display device comprising:
a plurality of light sources to generate light;
an optical module to condense and diffuse the light, the optical module comprising an optical unit including:
   a base;
   a light-condensing member comprising a first curved slant face protruding from the base and a second curved slant face protruding from the base, the second curved slant face being slated toward the first curved slant face; and
   a protrusion portion disposed on a surface of the light-condensing portion,
a display panel disposed over the optical module to display an image using light from the optical module.

15. The display device of claim 14, wherein the light sources have a first number and the optical unit receives the light from the light sources to form images of the light sources, the images having a second number that is greater than the first number.

16. The display device of claim 15, wherein the optical module further comprises an optical member configured to receive light from the optical unit to emit light having substantially uniform luminance with respect to a front direction of the base, wherein the images of the light sources are formed between the optical unit and the optical member.

17. The optical unit of claim 14, wherein the first and second curved slant faces are connected at a rounded top portion.

18. The display device of claim 17, wherein the first curved slant face comprises a first face protruding from the base to form a first angle with respect to the base and a second face extending from an upper portion of the first face to form a second angle with respect to the base, and
   the second curved slant face comprises a third face protruding from the base toward the first face to form the first angle with respect to the base and a fourth face extending from an upper portion of the third face to be connected to the second face, the fourth face forming the second angle with respect to the base,
   wherein the first angle is larger than the second angle.

19. The display device of claim 18, wherein the first and second faces are connected at a first rounded portion, and the third and fourth faces are connected at a second rounded portion.

* * * * *